UNITED STATES PATENT OFFICE.

ALEXR. H. EVERETT, OF NEW YORK, N. Y., ASSIGNOR TO AMERICAN CAR WHEEL AND RAILWAY CHAIR MANUFACTURING COMPANY, OF SAME PLACE.

IMPROVEMENT IN THE MANUFACTURE OF IRON.

Specification forming part of Letters Patent No. 48,483, dated June 27, 1865.

*To all whom it may concern:*

Be it known that I, ALEXANDER H. EVERETT, of the city of New York, have invented certain new and useful Improvements in the Composition and Manufacture of Iron; and I do hereby declare the following to be a full, clear, and exact description thereof.

My invention consists in the use of cryolite with cast or pig iron or its use with cast or pig iron and wrought-iron combined, by means of which an improved quality of metal is obtained, increasing its strength and density.

To enable those skilled in the art to use my improvement, I will proceed to describe the same.

Where cast-iron alone is used I use only the ordinary cupola furnace, simply adding to each one hundred pounds of iron three to five pounds of cryolite, using the precaution before drawing off to add any of the ordinary substances to thicken the slag which are in common use by foundrymen.

When it is desired to form a combination of cast and wrought iron I use a common wind-furnace, like those employed in the manufacture of steel. The proportions employed to constitute a fine tough iron are one hundred pounds cast-iron, twenty pounds wrought-iron, three pounds of cryolite. Another method is to take twenty pounds of wrought-iron and any number of pounds of cast-iron not less than twenty pounds and melt them together in a crucible, and when melted add to the remaining number of pounds of cast-iron, as drawn from the ordinary cupola, mixing them in the melted state. The addition of cryolite, which is a mineral substance consisting of fluoride of soda and aluminium, produces the following results: First, the carbon in the cast-iron, in combination with the heat of the furnace, decomposes the cryolite, reducing the aluminium to the metallic state, and thus forms an alloy of iron and aluminium, and a very small portion of the latter adds largely to the strength of the iron; second, the partial removal of the carbon from the iron, as above, adds largely to the strength of the metal and gives it much of the tenacity which characterizes wrought-iron; third, the action of the sodium and fluoric acid, both having a strong affinity for silica (and the former for phosphorus and sulphur) and other impurities always present in iron, with which impurities they combine, forming a fluid slag.

I prefer the mineral cryolite, but am aware that an artificial compound of the elements composing this mineral, or a portion of them, would produce the same result—as, for instance, oxide of aluminium and carbonate of soda, or, in fact, any combination of alumina that may be decomposed by carbon at a high temperature.

There are various modes of applying this invention, and the amount of the cryolite used will require to be varied according to the amount of impurities in the iron and the quality of metal desired.

The advantages to be derived from the use of this improved metal are important and varied. Reliable and official tests prove that metal produced as above described possesses a tensile strength equal to two and one-half times that of ordinary anthracite iron; and experiments also show its very remarkable capacity for receiving the chill or hardening, and to a greater depth and in a more perfect manner than any other known metal. Thus car-wheels of less weight and more strength can be produced with the periphery hardened so as to equal steel. The castings for reapers, mowers, plows, thrashers, horse-powers, drills, mill-gearing, and, in fact, every name and style of cast-iron castings which require strength and durability, can be reduced in weight and increased in strength by the use of the invention herein described and set forth.

What I claim as my invention, and wish to secure by Letters Patent, is—

1. The employment of cryolite or its component elements in the melting of cast-iron, for the purpose of refining and strengthening the same.

2. The employment of cryolite or its component elements in the melting of cast-iron and wrought-iron mixed, thereby producing a metal of great strength and fineness.

3. The use of cryolite as a purifying agent in the melting of irons.

ALEXANDER H. EVERETT.

Witnesses:
WM. T. DENNIS,
C. W. STAFFORD.